Figure 3:
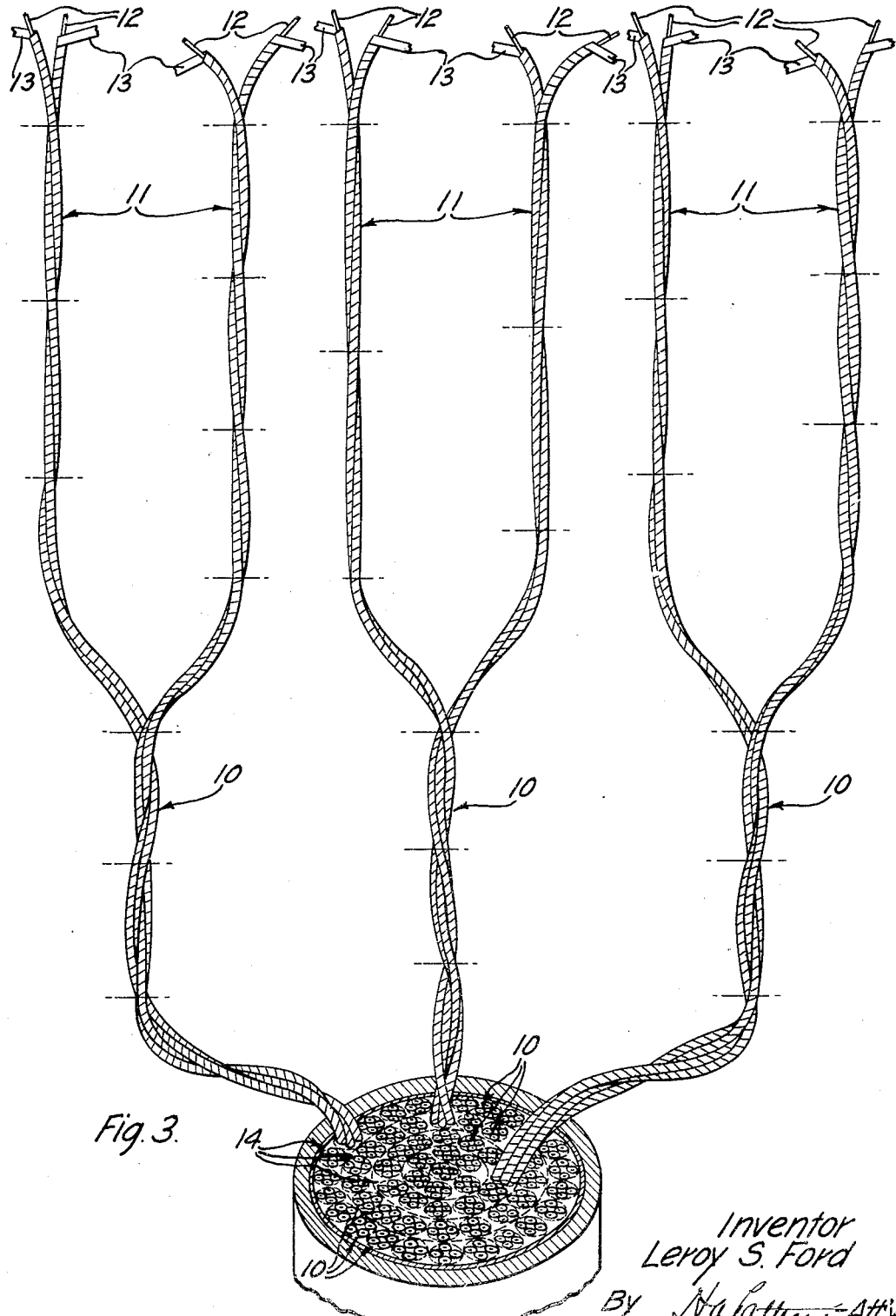

May 31, 1932.  L. S. FORD  1,860,498
ELECTRICAL CABLE
Original Filed Aug. 3, 1925  2 Sheets-Sheet 1
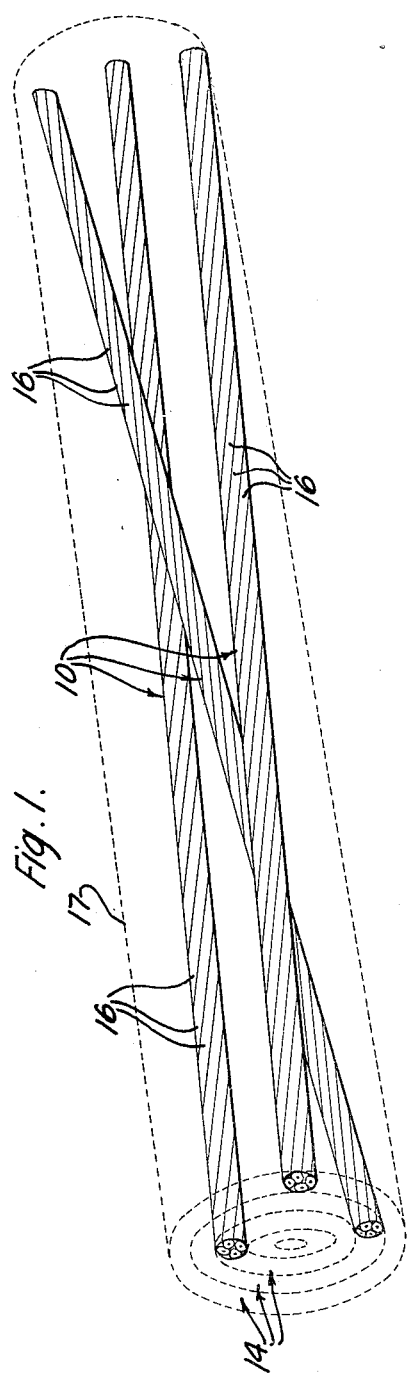
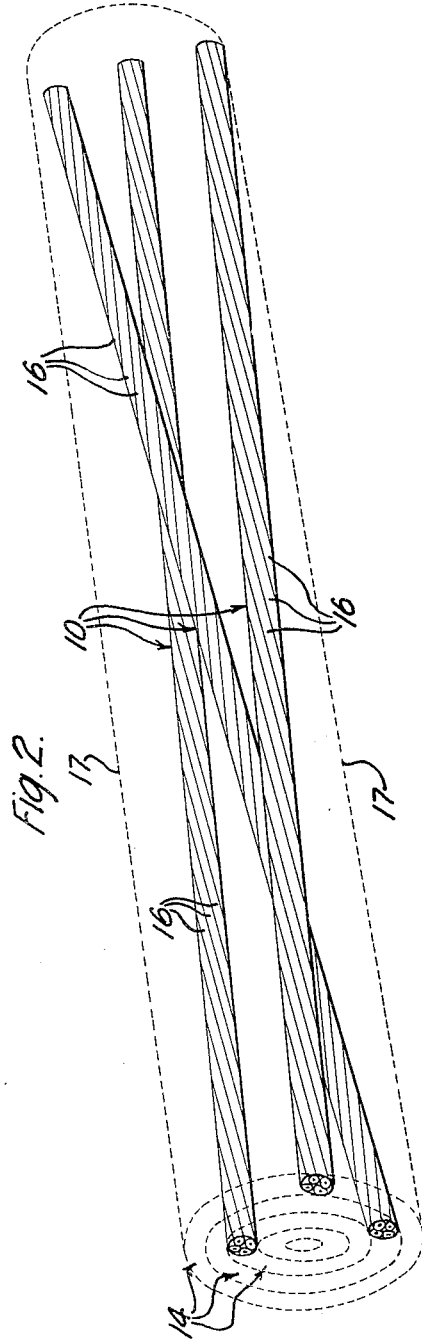
Inventor
Leroy S. Ford
By _____ Att'y.

May 31, 1932.   L. S. FORD   1,860,498
ELECTRICAL CABLE
Original Filed Aug. 3, 1925   2 Sheets-Sheet 2

Inventor
Leroy S. Ford

Patented May 31, 1932

1,860,498

UNITED STATES PATENT OFFICE

LEROY STEARNS FORD, OF RIVER FOREST, ILLINOIS, ASSIGNOR TO WESTERN ELECTRIC COMPANY, INCORPORATED, OF NEW YORK, N. Y., A CORPORATION OF NEW YORK

ELECTRICAL CABLE

Original application filed August 3, 1925, Serial No. 47,654. Divided and this application filed December 4, 1928. Serial No. 323,599.

This invention relates to electrical cables, and more particularly to cables of the type employed for the transmission of intelligence electrically, such as telephone cables.

This application is a division of my co-pending application Serial No. 47,654, filed August 3, 1925, issued September 3, 1929, as Patent 1,726,551.

In one type of telephone cables, a pair of conductors are formed by twisting together two insulated conductors and then twisting two such pairs together to form what is known as a "quad." Each pair of conductors in such a quad constitutes a side or physical circuit, while each of such pairs of conductors in parallel forms one side of a phantom circuit. The twist by which two conductors are combined to form a pair is called a pair twist, and the twist by which two pairs are combined to form a quad is called a phantom twist. The phantom twists may be in the same direction or in a reverse direction to one or both of the pair twists. When the cable comprises a plurality of layers of quads, the usual practice is to make the phantom twist of all the quads in the cable in a right hand direction and to strand or lay the layers of the cable alternately in right and left hand directions. This construction results in objectionable capacitance unbalance between the phantom circuits in adjacent layers. This capacitance unbalance is one of the principle causes of "cross-talk" or over-hearing between circuits.

It has been suggested that by forming a cable employing quads having phantom twists shorter than the twists of one or both of the pairs forming the quads, and proportioning the lengths of twists or lengths of lay of the phantoms and pairs, the capacitance unbalance between the pairs in the same quad and between circuits in adjacent quads, are greatly decreased. Such a construction is disclosed and claimed in Patent 1,271,824 to Anderegg et al., dated July 9, 1918.

It has also been suggested that the capacitance unbalance in a cable of the type described in the preceding paragraph can be further reduced by making the pair and phantom twists of the quads in each layer different from those in adjacent layers.

The object of this invention is to provide a cable particularly of the quadded type, embodying the two suggested constructions described above, wherein the capacitance unbalance between the phantom circuits in adjacent layers is further reduced, thereby resulting in a cable highly efficient in the transmission of electrical impulses over the conductors therein.

In order to attain this object in accordance with one embodiment of this invention there is provided a quadded cable embodying the features disclosed in the two constructions suggested above and in addition so constructed that the direction of the phantom twist of the quads in one layer is opposite to the phantom twist of the quads in an adjacent layer, the stranding or laying direction of each layer being opposite to the phantom twist of the quads therein.

Other objects and advantages of this invention will more fully appear from the following detailed description taken in connection with the accompanying drawings which diagrammatically illustrate the usual practice in the construction of cables of the hereinbefore mentioned type together with a specific embodiment of this invention, and in which Fig. 1 illustrates diagrammatically a multi-conductor cable of the usual construction having a plurality of layers of quads with the phantom twists of all the quads in the cable formed in a right hand direction and the layers stranded or laid alternately in right and left hand directions;

Fig. 2 illustrates diagrammatically a multi-conductor cable embodying this invention wherein the phantom twists of the quads in adjacent layers are in reverse directions and also in a direction reverse to the stranding direction of their associated layers, and Fig. 3 is a view in perspective of a quadded cable with quads of certain layers shown extending from the end thereof.

As shown in the drawings (Fig. 3) the quads 10 are formed by twisting together in the usual manner either in a right or left hand direction as desired two pairs 11, each pair being composed of two conductors 12 of any desired gauge. The conductors are preferably of copper, and are commonly covered with paper tape insulation 13 applied in a well known manner. The phantom twists of adjacent quads in the layer should in all cases be of different lengths regardless of the relative lengths of the pair twists and in addition the phantom twists of quads in adjacent layers should in all cases be different. Furthermore, the length of lay of the phantom twist of each quad should be shorter than the length of lay of the twist of one of the pairs thereof. The quadded cable is then completed by stranding alternately in right and left hand directions a plurality of the quads 10 into layers which are shown in dotted outline as indicated by the numeral 14. Any suitable type of strander or strand laying apparatus may be used, the construction and operation of which are well known to those skilled in the art. The completed cable core is generally enclosed in a lead sheath 15.

Referring now in detail to the several figures of the drawings, Fig. 1 illustrates diagrammatically a quadded cable of the usual construction. It will be observed that the phantom twist of all the quads 10 are in a right hand direction as clearly indicated by the short diagonal lines 16 thereon. This common direction of all the quads occurs regardless of the stranding direction of the different layers 14 which are stranded in alternate directions as indicated by the angular position of the quads 10 with respect to the dotted outline of the cable as indicated by the numeral 17.

In accordance with the general features of the present invention as illustrated in Fig. 2, the phantom twist of the quads 10 in one layer 14 is formed in a direction reverse to that of the quads in adjacent layers 14 and also in a direction reverse to the stranding direction of its associated particular layer.

An extended series of experiments has conclusively proven that quadded cables of the type disclosed and claimed in the hereinbefore mentioned patent and embodying the features of this invention as clearly indicated in Figs. 2 and 3, wherein the direction of the phantom twist of a quad in one layer is different than that of a quad in an adjacent layer and the stranding direction of each individual layer is opposite to the direction of the phantom twist of the quads occurring therein, results in a reduction in the capacitance unbalance between phantom circuits in adjacent layers such as to result in a material improvement in the operation of the cable, taken as a whole, from the standpoint of cross-talk.

What is claimed is:

1. A multi-conductor cable containing a plurality of layers of spirally laid quads, adjacent layers being laid in opposite directions, each quad consisting of two pairs having the length of the phantom twist therein shorter than the length of the twist of one of the pairs, and the direction of the phantom twist of all of the quads in each layer being opposite to the spiral lay of that layer.

2. A multi-conductor cable containing a plurality of layers of spirally laid quads, adjacent layers being laid in opposite directions, each quad consisting of two pairs having the length of the phantom twist therein shorter than the length of the twist of one of the pairs, the pair and phantom twists of the quads in each layer being of different lengths from those in adjacent layers, and the direction of the phantom twist of the quads in each layer being opposite to the spiral lay of that layer.

3. A multi-conductor cable containing a plurality of layers of spirally laid quads, each quad consisting of two pairs having the length of the phantom twist therein different than the length of the twist of one of the pairs, and the direction of the phantom twist of all of the quads in each layer being opposite to the spiral lay of that layer.

4. A multi-conductor cable containing a plurality of layers of spirally laid quads, adjacent layers being laid in opposite directions, and the direction of the phantom twist of all of the quads in each layer being opposite to the spiral lay of that layer.

5. A multi-conductor cable containing a plurality of layers of spirally laid quads, each quad consisting of two pairs, the direction of the phantom twists of the quads in one layer being opposite to the direction of the phantom twist of all of the quads in an adjacent layer, and the spiral lay of each layer being opposite to the direction of the phantom twist of the quads occurring in that layer.

6. A multi-conductor cable containing a plurality of layers of spirally laid quads, adjacent layers being laid in opposite directions, each quad consisting of two pairs having the length of the phantom twist therein different than the length of the twist of one of the pairs, the pair and phantom twists of the quads in each layer being of different lengths from those in adjacent layers, and the directions of the phantom twist of the quads in each layer being opposite to the spiral lay of that layer.

In witness whereof, I hereunto subscribe my name this 22d day of November A. D., 1928.

LEROY STEARNS FORD.